(12) United States Patent
Paré et al.

(10) Patent No.: US 6,223,938 B1
(45) Date of Patent: May 1, 2001

(54) MACHINE FOR DISPENSING A PREDETERMINED QUANTITY OF COFFEE

(76) Inventors: Sylvain Paré, 793, Route Gravel, Neuville, Québec (CA), G0A 2R0; Yvon Paré, 144, rue du Seigle, Saint-Augustin, Québec (CA), G3A 1S3

( * ) Notice: Subject to any disclaimer, the term of this patent is extended or adjusted under 35 U.S.C. 154(b) by 0 days.

(21) Appl. No.: 09/306,834

(22) Filed: May 7, 1999

(51) Int. Cl.[7] ................................................... B67D 5/62
(52) U.S. Cl. .......................... 222/63; 222/641; 222/642; 222/146.5; 222/157
(58) Field of Search .............................. 222/63, 640, 641, 222/642, 146.5, 156, 157, 383.1

(56) References Cited

U.S. PATENT DOCUMENTS

| | | | |
|---|---|---|---|
| 3,170,598 | 2/1965 | McPherson | 222/36 |
| 3,467,279 | 9/1969 | Upton et al. | 222/31 |
| 4,432,707 | 2/1984 | Anderson et al. | 417/477 |
| 4,736,875 | * 4/1988 | King | 222/641 |
| 4,927,060 | * 5/1990 | Snowball et al. | 222/146.5 |
| 5,392,827 | 2/1995 | Yasso et al. | 141/192 |
| 5,865,097 | * 2/1999 | Smit | 222/146.5 |
| 6,003,733 | * 12/1999 | Wheeler | 222/146.5 |
| 6,070,771 | * 6/2000 | Hart et al. | 222/146.5 |

* cited by examiner

*Primary Examiner*—Joseph A. Kaufman
(74) *Attorney, Agent, or Firm*—Goudreau Gage Dubuc

(57) ABSTRACT

A machine for dispensing a predetermined quantity of liquid upon actuation of a start switch is described herein. The machine includes a timer and at least one peristaltic pump connected to the timer. Upon actuation of the start switch, the timer energizes the peristaltic pump for a predetermined period of time to therefore transfer a predetermined quantity of liquid from a main reservoir to a cup.

9 Claims, 2 Drawing Sheets

MACHINE FOR DISPENSING A PREDETERMINED QUANTITY OF COFFEE

FIELD OF THE INVENTION

The present invention relates to coffee machines. More specifically, the present invention is concerned with an industrial coffee machine for dispensing a predetermined quantity of coffee upon request.

BACKGROUND OF THE INVENTION

Coffee dispensing machines are well known in the art. They usually include a manually operable valve provided with a handle actuated by a user to fill a cup to an appropriate level. This level is mainly determined by the hand-eye coordination of the user.

While the operation of this type of coffee dispensing machine is satisfactory when relatively low volumes of coffee has to be transferred from a main reservoir to cups, it is not so when the number of cups to be filled in a small period of time is high, for example, in hospital kitchens where hundreds of meals are prepared three times a day.

Indeed, for the workers of these volume feeding kitchen systems, it is generally difficult to manually transfer a predetermined quantity of coffee cup after cup when the number of cups to be filled is great and the time allotted to the cup filling operation is short. Furthermore, the risk of injury to the workers is increased since the worker's hands are necessarily in the vicinity of the manual valve during the transfer operation and may thus be scalded.

Three solutions have been proposed to overcome this drawback of conventional coffee dispensing machines.

The first solution involves the use of a timer-operated valve that, when an actuator is depressed, is opened for a predetermined duration. The drawback with this solution is that the quantity of coffee transferred by the valve from a main reservoir to a cup is a function of the quantity of coffee remaining in the main reservoir since the flow rate of the coffee through the valve is a affected by gravity.

The second solution also involves a timer-operated valve. However, instead of transferring a quantity of already prepared coffee from a main reservoir to a cup, a coffee-making syrup is mixed with hot water upon demand and transferred to the cup. This eliminates the above-mentioned drawback of the first solution since the hot water is contained under pressure, thus allowing the quantity of water transferred to be predetermined. It is however to be noted that the mix of coffee-making syrup and hot water produces a liquid that does not taste exactly like coffee that may cause gastric problems.

The third solution involves the use of a type of coffee machine making the coffee on a cup-by-cup basis upon activation of an actuator. A major drawback of this solution is the relatively long time required to brew a cup of coffee each time the machine is activated, making this type of machines inadequate for volume feeding kitchen system uses. Furthermore, the quantity of coffee beans required to make one cup of coffee with this type of machine is greater than with coffee machines making a reservoir of coffee at a time.

OBJECTS OF THE INVENTION

An object of the present invention is therefore to provide an improved machine for dispensing a predetermined quantity of coffee free of the above-mentioned drawbacks of the prior art.

SUMMARY OF THE INVENTION

More specifically, in accordance with the present invention, there is provided a machine for dispensing a predetermined quantity of liquid comprising:

a spout;

a reservoir provided with a fluid outlet;

at least one peristaltic pump having a fluid inlet connected to the fluid outlet of the reservoir; the at least one peristaltic pump having a fluid outlet connected to the spout;

a timer connected to the at least one pump; and a start switch connected to the timer;

wherein, upon activation of the start switch, the timer energizes the at least one peristaltic pump for a predetermined period of time, thereby dispensing a predetermined quantity of liquid from the reservoir.

According to another aspect of the present invention, there is provided a module for dispensing a predetermined quantity of liquid from the reservoir of a conventional hot liquid machine provided with a fluid outlet; the module comprising:

a spout at least one peristaltic pump having a fluid inlet connected to the fluid outlet of the conventional hot liquid machine; the at least one peristaltic pump having a fluid outlet connected to the spout;

a timer connected to the at least one pump; and a start switch connected to the timer;

wherein, upon activation of the start switch, the timer energizes the at least one peristaltic pump for a predetermined period of time, thereby dispensing a predetermined quantity of hot liquid from the reservoir of the conventional hot liquid machine.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
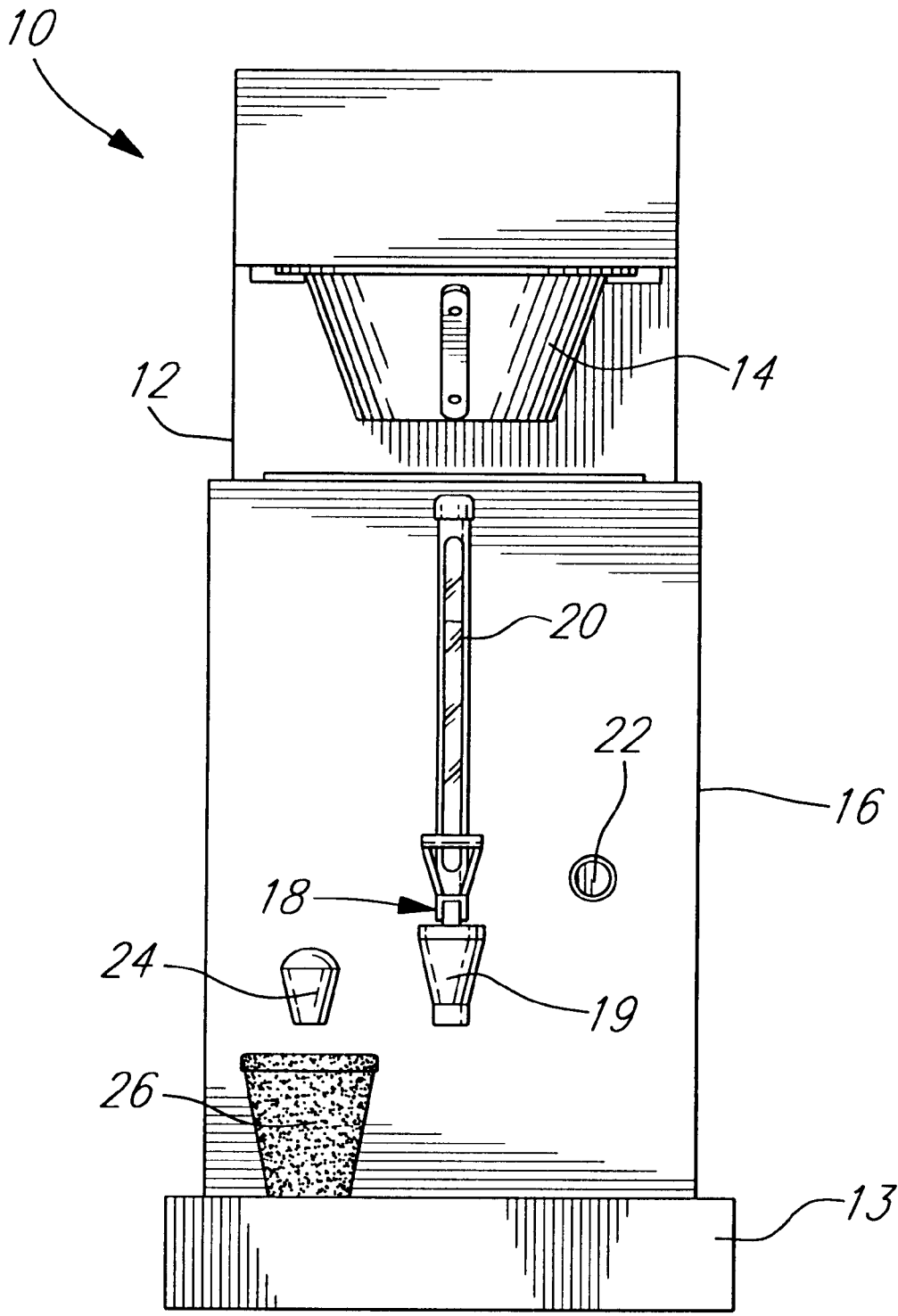
FIG. 1 is a front elevational view of a coffee machine according to an embodiment of the present invention.

Turning now to FIG. 1 of the appended drawings, a coffee machine 10 according to an embodiment of the present invention will be described.

The coffee machine 10 includes a body 12, a base 13, a filter holder 14, a main coffee reservoir 16, a conventional manually operable valve 18, provided with a first spout 19, and a coffee level indicator 20. The coffee machine 10 also includes a start switch 22 and a second spout 24.

The machine 10 may therefore either be used conventionally by manually operating the valve 18, for example to fill various size cups (not shown) via the first spout 19, or by actuating the switch 22 to fill a conventionally sized cup 26 via the second spout 24.

Figure 2:
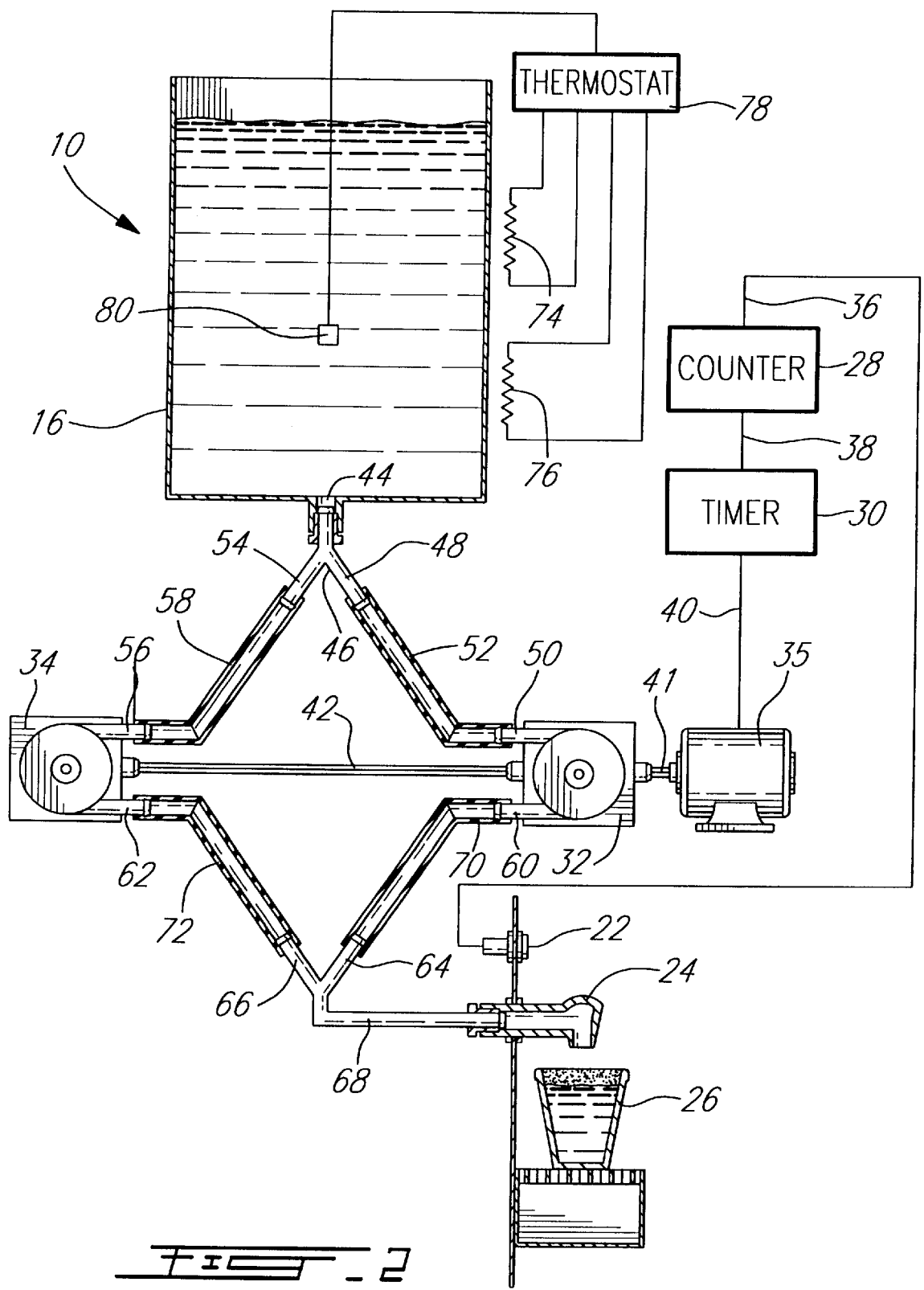
FIG. 2 is a schematic view of the coffee machine of FIG. 1.

As can be better seen from FIG. 2 of the appended drawings, the coffee machine 10 also includes a cup counter 28, an electronic timer 30, a primary peristaltic pump 32 a secondary peristaltic pump 34 and a motor 35 mechanically connected to the pumps 32 and 34.

On the one hand, the switch 22, the counter 28 and the timer 30 are interconnected to the motor 35 via electrical wires 36, 38 and 40. On the other hand, the motor 35 is connected to the pumps 32 and 34 via mechanical links 41, 42 such as, for example, straps. Or course, these links 41 and 42 are schematically illustrated in FIG. 2. It has been found that the motor manufactured by Barnant Co. under part number D-2504-B is adequate to drive both pumps 32 and 34. This motor is an AC motor provided with an integrated cooling fan. Of course, other motors could be used. Preferably, these motors should be designed to be energized and deenergized every 4 to 5 seconds and provide enough power to drive both pumps 32 and 34.

The counter 28 indicates the number of times the start switch 22 has been actuated, hence the number of cups taken from the reservoir 16. It has been found that counters made by the Eaton corporation under part number W153094 and name Durant® are suitable for this application.

The timer 30, on the other hand, controls the operation of the pumps 32 and 34. Generally stated, the timer energizes both pumps 32 and 34 for a predetermined and adjustable period of time upon each actuation of the start switch 22.

The main reservoir 16 is connected to the second spout 24 via the pumps 32 and 34. More specifically, a fluid outlet 44, provided at the bottom of the reservoir 16, is fitted with a first Y-junction 46. A first branch 48 of the Y-junction 46 is connected to a fluid inlet 50 of the first pump 32 via a conduit 52. Similarly, a second branch 54 of the Y-junction 46 is connected to a fluid inlet 56 of the second pump 34 via a conduit 58. Respective outputs 60, 62 of the pumps 32 and 34 are connected to branches 64, 66 of a second Y-junction 68 via conduits 70, 72. The second Y-junction 68 is fitted to the spout 24.

The second spout 24 includes an air chamber to decrease the splashing caused by the action of the peristaltic pumps 32 and 34.

FIG. 2 also schematically illustrates a pair of heating elements 74 and 76 electrically connected to a thermostat 78 that controls their energization. The thermostat 78 includes a temperature sensor 80 provided in the reservoir 16. The thermostat 78 is so programmed that one of the heating elements 74 and 76 is constantly energized while the other heating element is only energized when the temperature of in the reservoir 16 falls under a first predetermined level. Of course, the other heating element is deenergized when the temperature reaches a second predetermined level. More specifically, it has been found that if the reservoir 16 has a capacity of 7.27 gallons (about 33 litres), two 180 watt heating elements are sufficient to keep the temperature inside the reservoir 16 at 180±10° F. (about 82±6° C.).

As will be easily understood by one skilled in the art, the compartment (not shown) where the electrical elements of the coffee machine 10 are installed is advantageously provided with louvers allowing heat to be exhausted. Advantageously, the coffee machine 10 is also provided with an exhaust fan (not shown) to increase the cooling of this compartment.

It is to be noted that since the peristaltic pumps 32 and 34, the timer 30, the Y-junctions 46, 68 and the conduits 52, 58, 70 and 72 are exposed to relatively high temperatures, these elements of the coffee machine 10 must be carefully selected to withstand this environment. For example, the Y-junctions are advantageously be made of stainless steel while the conduits are manufactured by Norton Company under the name Norprene®. The peristaltic pump described in U.S. Pat. No. 4,432,707 to Anderson et al. has been found suitable for the present application. However, the peristaltic pump described in U.S. Pat. No. 3,358,609 manufactured by Barnant Company under model number 7035-20 has been found superior since it includes three rollers in contact with the inner tube of the pump, thereby preventing leakage of the liquid from the reservoir 16. The principles of operation of peristaltic pumps are believed well known in the art and will not be discussed herein for concision purposes.

Of course, the timer 30 may be specifically designed for this application. However, it has been found that the timer manufactured by Potter & Brumfield under part number 3702 is adequate since it may operate under the high temperature of the coffee machine 10.

In operation, when the start switch 22 is actuated by a user, the counter 28 is incremented and the timer 30 is activated. As mentioned hereinabove, the timer 30, when activated, energizes the peristaltic pumps 32 and 34 for a predetermined period of time to cause a known quantity of coffee to be transferred from the main reservoir 16 to the cup 26.

Of course, the duration of the predetermined period of activation of the pumps 32 and 34 by the timer 30 may be adjusted by the user via controls (not shown) of the timer 30. It is therefor possible to precisely adjust the quantity of coffee transferred from the main reservoir to the cups.

As will be easily understood by one skilled in the art, since the pumps 32 and 34 are peristaltic pumps, the decreasing level of coffee in the main reservoir 16 does not adversely affect the quantity of coffee transferred to the cup.

It is to be noted that even though the coffee machine 10 includes the conventional manually operable valve 18, this valve is not essential to the invention and could therefore be omitted without departing from the spirit of the present invention. Similarly, as mentioned hereinabove, the counter 28 is provided to indicate to the owner of the coffee machine 10 how many cups of coffee were taken from the main reservoir 16. Hence, this counter 28 could be removed from the coffee machine 10 without modifying the coffee transferring operations.

As will be easily understood by one skilled in the art, the secondary peristaltic pump 34 could be removed without modifying the operation of the machine 10. Of course, if only one peristaltic pump is used, the cup filling time is increased. The duration of activation of the remaining peristaltic pump by the timer 30 should therefore be adjusted accordingly. This feature is advantageous since the machine 10 could operate, at lower speed, should one of the peristaltic pump 32 and 34 fail.

For some specific applications, a secondary start switch (not shown) could be provided and connected to a secondary timer (not shown) to allow two sizes of cups to be filled via the same pumps and spout.

It is also to be noted that the timer 30 could be replaced by a flowmeter (not shown) monitoring the quantity of coffee delivered by the spout 24 and stopping the pumps 32 and 34 when the predetermined quantity is reached.

Of course, the coffee could be replaced by another liquid in the reservoir 16.

As will be apparent to one skilled in the art, the basic principles of the present invention could be applied to a conventional reservoir-type coffee machine (not shown) having a conventional manually actuated valve. To achieve this, the start switch 22, the spout 24, the counter 28, the timer 30 and the peristaltic pumps 32 and 34 could be packaged in a separate module provided with a fluid inlet (not shown) connected to the respective fluid inlets 50 and 56 of the peristaltic pumps 32 and 34. This fluid inlet would be connected to the spout of the conventional reservoir-type coffee machine and the manual valve of this machine would be open. The operation of such a module would be identical to the operation of the coffee machine 10 described hereinabove.

Although the present invention has been described hereinabove by way of preferred embodiments thereof, it can be modified, without departing from the spirit and nature of the subject invention as defined in the appended claims.

What is claimed is:

1. A machine for dispensing a predetermined quantity of liquid comprising:

a spout;

a reservoir having a fluid outlet provided with a Y-junction;

first and second peristaltic pumps having respective fluid inlets connected to respective branches of said Y-junction of said reservoir; said first and second peristaltic pumps having respective fluid outlets connected to said spout;

a timer connected to said first and second peristaltic pump; and a start switch connected to said timer;

wherein, upon activation of said start switch, said timer energizes said first and second peristaltic pumps for a predetermined period of time, thereby dispensing a predetermined quantity of liquid from said reservoir.

2. A machine as recited in claim 1, where said liquid is coffee.

3. A machine as recited in claim 1, further comprising a second Y-junction connected to said spout; said second Y-junction having a first branch connected to said fluid outlet of said first peristaltic pump and a second branch connected to said fluid outlet of said second peristaltic pump.

4. A machine as recited in claim 1, wherein said predetermined period of time is adjustable.

5. A machine as recited in claim 1, further comprising:

a thermostat having a temperature sensor associated with said reservoir;

a first heating element connected to said thermostat;

a second heating element connected to said thermostat; wherein said thermostat is so programmed as to continuously energize said first heating element and to energize said second heating element when said temperature sensor detects that the temperature of the reservoir is within a predetermined range.

6. A module for dispensing a predetermined quantity of liquid from the reservoir of a conventional hot liquid machine provided with a fluid outlet;

said module comprising:

a spout a Y-junction connected to the fluid outlet of the hot liquid machine;

first and second peristaltic pumps having respective fluid inlets connected to respective branches of said Y-junction; said first and second peristaltic pumps respective fluid outlets connected to said spout;

a timer connected to said at least one pump; and a start switch connected to said timer;

wherein, upon activation of said start switch, said timer energizes said first and second peristaltic pumps for a predetermined period of time, thereby dispensing a predetermined quantity of hot liquid from said reservoir of said conventional hot liquid machine.

7. A module as recited in claim 6,where said hot liquid is coffee.

8. A module as recited in claim 6, further comprising a second Y-junction connected to said spout; said second Y-junction having a first branch connected to said fluid outlet of said first peristaltic pump and a second branch connected to said fluid outlet of said second peristaltic pump.

9. A module as recited in claim 6, wherein said predetermined period of time is adjustable.

* * * * *